April 22, 1930.    W. S. POETZINGER    1,755,663
METHOD OF TRUING VALVE FORGINGS AND THE LIKE Filed March 21, 1927

Inventor
William S. Poetzinger
By Whittemore Hulbert Whittemore
Belknap
Attorneys Patented Apr. 22, 1930

1,755,663

UNITED STATES PATENT OFFICE

WILLIAM S. POETZINGER, OF LANSING, MICHIGAN, ASSIGNOR TO REO MOTOR CAR COMPANY, OF LANSING, MICHIGAN, A CORPORATION OF MICHIGAN

METHOD OF TRUING VALVE FORGINGS AND THE LIKE

Application filed March 21, 1927. Serial No. 177,174.

This invention relates to the method of truing valve forgings and the like and has among its objects to provide a simple, expedient, economical and commercially satisfactory method of this character.

In the manufacture of valves such as poppet valves and the like, which are customarily drop-forged, it is found that the head of the valve is frequently distorted and disposed non-uniformly with respect to the stem of the valve. Care must be taken in correcting this lack of uniformity or irregularity of the valve head because otherwise when the valve is later put in use and subjected, for instance, to the heat of an internal combustion engine the parts tend to resume their previous disaligned positions with the result that the valve fails to function properly.

It is therefore, the primary object of this invention to provide means for truing up such types of valves and to operate upon the valves while the same is in a highly heated condition and in such a manner that the head is caused to assume a uniform and correct position with respect to the stem, with rapidity and precision.

The manner in which my improved method is practiced as well as the mechanism by means of which it is carried into execution will be more fully described as this description proceeds, especially when considered in connection with the accompanying drawings wherein.

Figure 1:
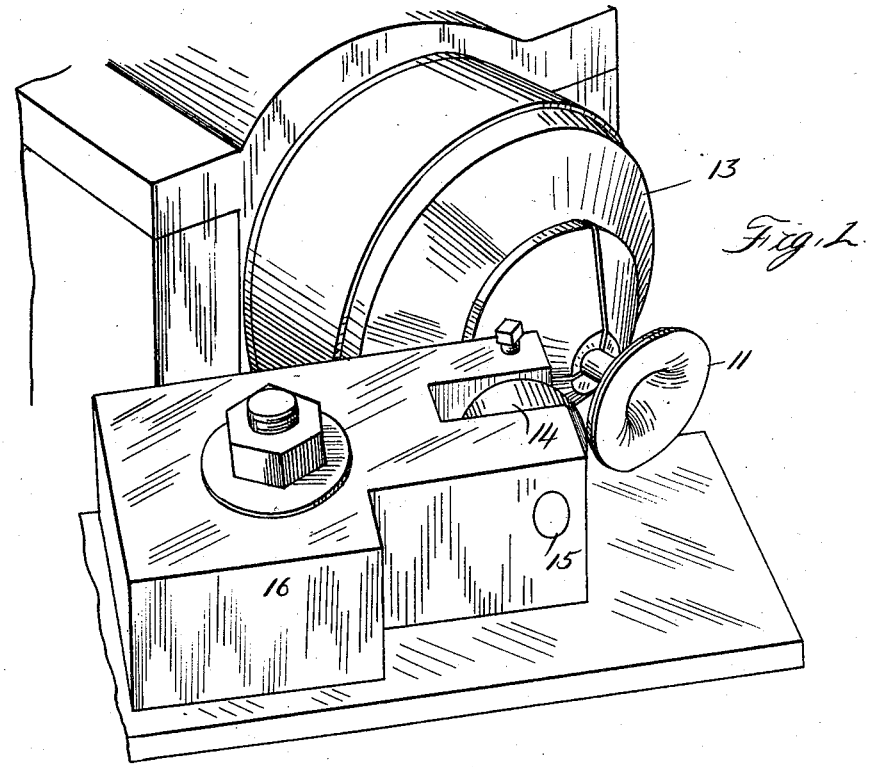
Figure 1 is a perspective view of the apparatus employed.
Figure 2:
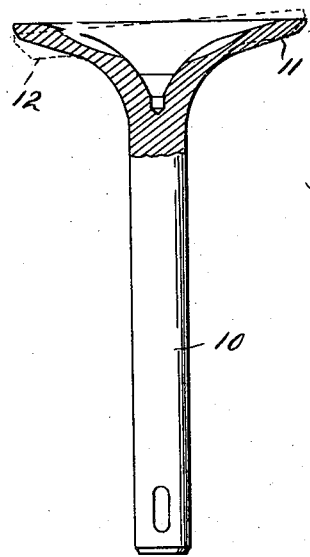
Figure 2 is a sectional elevational view of the valve operated upon.

Referring now particularly to the drawings wherein like reference characters indicate like parts, it will be noted that in Figure 2 I have illustrated a valve of the poppet valve type which includes a stem 10 and a head 11. Valves of this character are usually commercially produced by drop-forging the same and frequently, owing to any one of a number of different reasons, the head 11 of the valve is found to be slightly angularly disposed or out of its true plane with reference to the stem 10 or in other words to be disposed with reference to the stem 10 as suggested by dotted line 12 in Figure 2. Obviously it is necessary that the valve head be straightened or trued up and disposed in uniform relation with respect to the stem 10 and for accomplishing this I provide the following mechanism.

The stem 10 of the valve is engaged in a rotary chuck 13 and rotated in a predetermined and fixed plane about the longitudinal axis of the valve. During this rotation the head 11 is engaged by a truing element 14 upon a shaft 15 carried by a support 16. The truing element 14 is arranged in a predetermined fixed relation with reference to the axis of rotation of the valve and as illustrated in the drawings is arranged at an angle with reference to the longitudinal axis of the valve. During the rotation of the valve, the valve head will be engaged by the truing element to thus exert a pressure tending to right the valve head and dispose the same in a uniform plane which intersects at right angles a plane passing through the axis of the valve stem. In this manner any irregularities or angularities of the valve head are corrected and the head disposed in a true and uniform relation with reference to the stem.

It should be understood that the step of truing the valve is performed while the valve forgings are hot and in practice the valves are taken directly from the forge to the truing up machine thus eliminating the necessity of re-heating the forgings. It is obvious, however, that in some instances it may be desirable or expedient to re-heat the forgings before the truing up operation.

It should furthermore be understood that the stem 10 of the valve is gripped throughout the greater portion of its length by the jaws of the chuck 13 so that any possibility of the same becoming distorted or unbalanced longitudinally is eliminated.

While one type of apparatus is herein illustrated and described as suitable for carrying into execution the method herein described and claimed, it will be readily apparent to those skilled in this art that other forms of apparatus may be employed with equal facility and to this end reservation is made to make such changes in the details of the construction illustrated as may come within the purview of the accompanying claims.

What I claim as my invention is:—

1. The method of truing valve forgings which consists in rotating the valve while hot in a predetermined fixed plane and engaging the head with a truing element arranged in fixed relation to the axis of rotation of the valve, to displace by pressure certain portions of the head to dispose the same uniformly with respect to the stem of the valve.

2. The method of truing valve forgings which consists in rotating the valve about a predetermined and fixed axis, and engaging the head with a template operative to dispose by pressure certain portions of the head in uniform and predetermined relation to the stem.

3. The method of truing valve forgings which consists in rotating the valve about a predetermined and fixed axis, and engaging the head with a template arranged at an angle to the axis of the valve and operative to bend non-uniform portions of the head in uniform and predetermined relation to the stem.

4. The method of truing valve forgings which consists in rotating the valve about the axis of its stem and applying pressure to the head by means of a truing roller arranged at an angle to the axis of rotation of the valve to bend the same into a uniform relation to the stem.

5. The method of truing valve forgings which consists in rotating the valve about the axis of its stem and subjecting the head of the valve to pressure tending to bend and square the same relative to the axis of the stem.

6. The method of truing valve forgings which consists in rotating the valve about the axis of its stem, and applying pressure to the head of the valve by means of a truing roller tending to bend and dispose the head in a plane which intersects at right angles a plane passing through the axis of the valve stem.

7. The method of truing valve forgings which consists in gripping the stem of the valve throughout the greater portion of its length, rotating it about the axis of the stem, and engaging the head of the valve with a template arranged at an angle to the axis of rotation of the valve to displace by pressure portions of the head to dispose the same in uniform relation to the stem.

8. The method of truing valve forgings which consists in rotating the valve about a predetermining and fixed axis, and engaging the head with a template arranged at an angle to the axis of rotation of the valve and operative to apply sufficient pressure to displace portions of the head and arrange the same in uniform relation to the stem.

In testimony whereof I affix my signature.

WILLIAM S. POETZINGER.